United States Patent [19]

Rasshofer et al.

[11] Patent Number: 4,645,630
[45] Date of Patent: Feb. 24, 1987

[54] PROCESS FOR THE PRODUCTION OF MICROCELLULAR OR FOAMED MOLDINGS AND COMPOUNDS CONTAINING ISOCYANATE-REACTIVE GROUPS SUITABLE FOR CARRYING OUT THIS PROCESS

[75] Inventors: Werner Rasshofer, Cologne; Hans-Joachim Meiners, Leverkusen; Klaus Seel, Cologne; Hans-Georg Wussow, Duesseldorf, all of Fed. Rep. of Germany

[73] Assignee: Bayer Aktiengesellschaft, Leverkusen, Fed. Rep. of Germany

[21] Appl. No.: 645,734

[22] Filed: Aug. 30, 1984

[30] Foreign Application Priority Data

Sep. 16, 1983 [DE] Fed. Rep. of Germany ....... 3333464

[51] Int. Cl.$^4$ .................... B29C 67/22; B29C 45/00; C08J 9/34; C08G 18/18
[52] U.S. Cl. .................................. 264/54; 264/45.3; 264/45.5; 264/50; 264/53; 264/300; 264/DIG. 5; 264/DIG. 83; 428/318.8; 521/51; 521/163
[58] Field of Search ................ 264/DIG. 83, 45.5, 51, 264/54, 53, 45.3, DIG. 5, 300, 53, 50; 521/51, 163, 164, 167; 428/318.8

[56] References Cited

U.S. PATENT DOCUMENTS 3,256,213  6/1966  Gmitter et al. .
3,425,964  2/1969  Stanley .
4,288,564  9/1981  Conover et al. ............ 264/DIG. 83
4,469,653  9/1984  Nissen et al. ................ 264/DIG. 83
4,483,974  11/1984 Grögler et al. .................... 521/51 X
4,499,038  2/1985  Schäfer et al. ......................... 264/51
4,500,656  2/1985  Rasshofer et al. .................. 521/164

FOREIGN PATENT DOCUMENTS 0081701  6/1983  European Pat. Off. .
52175    5/1975  Japan .
92010    7/1981  Japan .
98186    8/1981  Japan .

Primary Examiner—Philip Anderson
Attorney, Agent, or Firm—Gene Harsh; Joseph C. Gil; Thomas W. Roy

[57] ABSTRACT

The present invention relates to a process for the production of polyurethane-urea or polyurea-based microcellular of foam moldings by reacting a polyisocyanate component containing aromatically bound isocyanate groups with an isocyanate-reactive component containing at least one compound which has at least three aliphatic ether groups and aliphatically bound isocyanate-reactive groups and wherein a portion of the aliphatically bound-reactive groups are amino groups which have been converted to ammonium carbamate, carbonate or bicarbonate groups.

The present invention also relates to the compounds containing aliphatic ether groups and ammonium carbamate, carbonate or bicarbonate groups, optionally in admixture with compounds containing unmodified amino groups or other known isocyanate-reactive compounds.

9 Claims, No Drawings

PROCESS FOR THE PRODUCTION OF MICROCELLULAR OR FOAMED MOLDINGS AND COMPOUNDS CONTAINING ISOCYANATE-REACTIVE GROUPS SUITABLE FOR CARRYING OUT THIS PROCESS

BACKGROUND OF THE INVENTION

1. Field of the Invention

This invention relates to a new process for the production of microcellular or foamed moldings wherein the reaction mixture—to be introduced into closed molds—is based on organic polyisocyanates and compounds containing isocyanate-reactive groups having as their main components specific compounds containing ammonium carbonate and/or ammonium bicarbonate groups, as described in more detail hereinafter, and to compounds suitable for carrying out this process.

2. Description of the Prior Art

It is known that carbonates and/or bicarbonates (hydrogen carbonates) of aliphatic mono- or polyamines can be produced from those amines, carbon dioxide and water. Crystalline compounds which are solid at room temperature and which are either insoluble or substantially insoluble in polyhydroxyl compounds, of the type normally used in the production of polyurethanes, are formed in these known processes. These crystalline compounds may be reacted with compounds containing isocyanate groups to form relatively high molecular weight compounds containing urea groups. Thus, U.S. Pat. No. 3,425,964 describes the hardening of polyurethane resins with solid amino carbonates, which can be stored indefinitely at 25° C., and also the production of foamed products from those reactants. In this case, the poor solubility and the resulting poor reactivity of the amino carbonates are utilized by initially applying the reaction mixture to a steel plate and subsequently effecting formation of the foam structure at elevated temperatures with release of the carbon dioxide and crosslinking with the released amine. Similar processes are described in published Japanese Patent Application No. 92 010 (Application No. 72 13 068 filed 17.12.1968) and in published Japanese Patent Application No. 98 186 (Application No. 50-052 175 filed 3.9.1973).

Apart from these very special prior art processes, the poor solubility of the known carbonates and bicarbonates of organic polyamines in the starting materials used for the production of polyurethane plastics must be regarded as a serious disadvantage because satisfactory compatibility of the reactants is generally an essential requirement for the production of high-quality polyisocyanate polyaddition products. This is very probably the reason why the known aminocarbonates which are solid at room temperature have never been used in the practice as starting materials for the production of polyurethane plastics.

New compounds containing isocyanate-reactive groups have now surprisingly been found wherein the isocyanate-reactive groups are at least partly ammonium carbonate or ammonium bicarbonate groups of the type formed by the reaction of aliphatically bound primary or secondary amino groups with carbon dioxide and water. The new compounds are liquids which are stable in storage at room temperature and react off spontaneously with organic polyisocyanates with release of the carbon dioxide. The (co-)use of these compounds according to the invention, which are described in detail hereinafter, in the production of polyisocyanate polyaddition products (polyureas or polyurethane-ureas) affords a number of remarkable advantages, particularly in the production of microcellular or foamed moldings based on the above-mentioned starting materials.

In the production of polyurea-based microcellular moldings, i.e. moldings of which the density is about at least 10% and preferably 20 to 40% below the density of a corresponding, solid molding, the co-use of the new compounds provides above all for satisfactorily controllable metering of the blowing agent (the carbon dioxide released). In addition, the new compounds according to the invention are eminently suitable for the production of foamed polyurethane-urea moldings having a compact surface skin, i.e. moldings having a gross density of more than 40% and generally 45 to 85% below the density of a corresponding, solid molding. In the production of foamed moldings by the conventional process, particularly using organic blowing agents, so-called dwell zone markings often become visible because the reaction mixture does not begin to foam immediately. In addition, an often inadequate compatibility of the reactants is reflected in the form of streaks visible on the molding. These unfavorable phenomena can also be eliminated by the co-use of the compounds according to the invention because they react spontaneously with the polyisocyanate component with elimination of carbon dioxide so that no visibly marked dwell zones can be formed. Further, because of the liquid nature of the reactants, they may be more homogeneously mixed, thereby avoiding the formation of any streaks. Accordingly, the co-use of the compounds according to the invention in the production of moldings of the type in question, even in very low concentrations, often brings about a significant improvement in the surface of the moldings, by virtue of which homogeneous lacquer finishes can be obtained, for example by immersion lacquering of the moldings.

SUMMARY OF THE INVENTION

The present invention relates to a process for the production of polyurethane-urea or polyurea-based microcellular or foam moldings by reacting in closed molds in accordance with the one-shot process
 (a) a polyisocyanate component containing aromatically bound isocyanate groups and selected from diisocyanates and polyisocyanates and
 (b) a component based on compounds containing isocyanate-reactive groups, which comprises at least one compound (b1) containing at least three aliphatic ether groups and n-aliphatically bound isocyanate-reactive groups and is characterized by the following,
   (i) at least 100/n percent of said aliphatically bound isocyanate-reactive groups are aliphatically bound primary or secondary amino groups,
   (ii) at least 20% of the total number of aliphatically bound primary or secondary amino groups are modified amino groups selected from ammonium carbamate groups having a functionality of 2 in the isocyanate addition reaction and prepared by reacting aliphatically bound primary or secondary amino groups with carbon dioxide and ammonium carbonate and ammonium bicarbonate groups formed by the reaction of aliphatically bound primary or secondary amino groups with carbon dioxide and water, (iii) at least 20% of the total number of said modified amino groups of (ii) being carbonate and/or bicarbonate groups, (iv) the unmodified compounds containing ether groups but prior to containing ammonium carbamate, carbonate or bicarbonate groups having a molecular weight of from about 200 to 10,000 and (v) from about 0.2 to 100% of the total number of isocyanate-reactive groups of component (b) being ammonium carbamate, carbonate or bicarbonate groups wherein n is a whole or fractional number from 2 to 4 and the ratio of component (a) to (b) is chosen to provide an isocyanate index of from 70 to 130.

The present invention also relates to the compounds containing at least three aliphatic ether groups and n aliphatically bound isocyanate-reactive groups set forth in component (b) above.

DETAILED DESCRIPTION OF THE INVENTION

In accordance with the present invention the term "aliphatic" also includes "cycloaliphatic."

The compounds (b1) previously mentioned with regard to component (b) of the present invention are derivatives of compounds containing at least three aliphatic ether groups and (on a statistical average) from 2 to 4 and preferably 2 to 3 aliphatically-bound-isocyanate-reactive groups. These compounds have an (average) molecular weight which may be calculated from the functionality and the content of isocyanate-reactive groups of from about 200 to 10,000, preferably from about 400 to 10,000 and more preferably from about 1000 to 6000. In the derivatives, i.e. the compounds containing modified amino groups, at least 100/n percent of all the aliphatically bound isocyanate-reactive groups are aliphatically bound primary and/or secondary amino groups. In these derivatives n is a whole or fractional number of from 2 to 4 and preferably from 2 to 3 and represents the functionality (in the isocyanate addition reaction) of the compounds containing isocyanate-reactive groups. Where mixtures of different compounds are present, n represents the average functionality of the mixture. Preferably, at least about 50% and more preferably about 80 to 100% of all the aliphatically bound isocyanate-reactive groups are aliphatically bound primary and/or secondary amino groups.

It is a requirement of the present invention that at least 20% and preferably at least about 50% of the total number of amino groups are present in the form of modified amino groups selected from the groups of ammonium carbamate groups having a functionality of 2 in the isocyanate addition reaction and formed by the reaction of aliphatically bound primary or secondary amino groups with carbon dioxide or in the form of ammonium carbonate or ammonium bicarbonate groups formed by the reaction of aliphatically bound primary or secondary amino groups with carbon dioxide and water. It is an additional requirement of the present invention that at least 20%, preferably at least about 50% and more preferably from about 80 to 100% of the total number of modified amino groups are ammonium carbonate or ammonium bicarbonate groups.

The compounds according to the invention are preferably derivatives of the aliphatic polyether polyols containing primary and/or secondary hydroxyl groups known per se from polyurethane chemistry, in which at least some of the hydroxyl groups present have been converted by methods known per se into amino groups and subsequently into modified amino groups by at least partial modification with carbon dioxide and water.

In the reaction of primary or secondary amino groups with carbon dioxide or with carbon dioxide and water, carbamates having a functionality of 2 in the isocyanate addition reaction or bicarbonates or carbonates are formed (depending on the molar ratio of carbon dioxide to water) as can be seen from equations 1 to 3 below (R represents an indifferent (cyclo)-aliphatic radical of any kind):

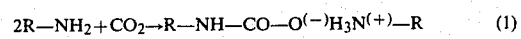  (1)

  (2)

  (3)

In this connection, reference is made to the Articles by A. Smola in Mitt. Chem. Forsch. Inst. Oester. 2, 38–40, 43–45 (1948)/C.A. (1949), 6157h so far as the structures and production of these carbonic acid derivatives of amines are concerned. The question of whether the modification products of the amines with carbon dioxide and water are mainly carbonates or bicarbonates is of no significance to the invention. Thus, it may be assumed for example that, where 1 mole of primary amino groups is reacted with 0.6 mole of carbon dioxide in the presence of water, at least 60% of the amino groups (the limit where bicarbonate groups only are formed), but in general a far higher percentage of the amino groups is converted into modified amino groups (formation of bicarbonate and carbonate groups). What is important, however, is that the quantity of water used in the modification of the amines should be selected in such a way that, in accordance with the foregoing observations, at most 80 equivalent percent of the modified amino groups are present in the form of carbamate groups (equation (1)). The above-mentioned compounds containing modification products of the amino groups are collectively referred to hereinafter as "carbonic acid salts".

The "aminopolyethers" or "polyether amines" suitable for use in the production of the "carbonic acid salts" are known per se. They are produced, for example, by converting at least some of the primary and/or secondary hydroxyl groups of the polyhydroxy polyethers known per se into aliphatically bound, preferably primary, amino groups either by replacing the hydroxyl groups with amino groups or by reacting the hydroxyl groups with reagents containing amino groups or groups convertible into amino groups. For example, polyhydroxyl polyethers, such as polypropylene glycol ethers, may be aminated by reaction with ammonia in the presence of Raney Nickel and hydrogen (BE-PS No. 634,741). U.S. Pat. No. 3,654,370 describes the production of polyoxyalkylene polyamines by reacting the corresponding polyol with ammonia and hydrogen in the presence of a nickel, copper or chromium catalyst. DE-PS No. 1,193,671 describes the production of polyethers containing terminal amino groups by the hydrogenation of cyanoethylated polyoxy propylene ethers. Other methods for the production of polyoxyalkylene (polyether) amines are described in U.S. Pat. No. 3,155,728, in U.S. Pat. No. 3,236,895 and in FR-PS No. 1,551,065. FR-PS No. 1,466,707 describes for example the production of polyethers containing secondary amino groups as terminal groups.

Polyhydroxyl polyethers suitable for use as starting materials are any polyhydroxyl polyethers containing at least 3 aliphatically bound ether groups with 2 to 4, preferably 2 to 3 hydroxyl groups attached to aliphatic, primary or secondary carbon atoms. These polyhydroxy polyethers known per se are obtained, for example, by the polymerization of epoxides, such as ethylene oxide, propylene oxide, butylene oxide, tetrahydrofuran, styrene oxide or epichlorohydrin, on their own, for example in the presence of Lewis catalysts such as $BF_3$, or by the addition of these epoxides, preferably ethylene oxide and propylene oxide, optionally in admixture or successively, onto starter components containing reactive hydrogen atom such as water, alcohols, ammonia or amines. Examples include ethylene glycol, 1,3- or 1,2-propylene glycol, trimethylol propane, glycerol, sorbitol, 4,4'-dihydroxy diphenyl propane, aniline, ethanolamine or ethylene diamine. In many cases, it is preferred to use polyethers of the type which predominantly contain secondary OH-groups (up to about 90% by weight, based on all the OH-groups present in the polyether).

According to DE-OS 29 48 419, EP-OS No. 71 138 and EP-OS No. 71 139, aliphatic amino polyethers are obtained by the hydrolysis of compounds containing terminal isocyanate groups. In this process, polyethers containing 2 or 3 hydroxyl groups are preferably reacted with polyisocyanates to form NCO-prepolymers and, in a second step, the isocyanate group is converted by hydrolysis into an amino group. Amino polyethers such as these containing urethane groups are also suitable for use in the production of the "carbonic acid salts" according to the invention.

In the conversion of the polyhydroxy polyethers into amino polyethers by any of the processes mentioned by way of example, it is always important to ensure that (on a statistical average) at least $100/n$ % (n=functionality of the polyhydroxy polyether), preferably at least about 50% and more preferably about 80 to 100% of the hydroxyl groups are converted into amino groups.

It is also important to ensure that the polyhydroxy polyethers used are of the type which lead to "amino polyethers" having a molecular weight (calculable from the functionality and the content of functional groups) of from about 200 to 10,000, preferably from about 400 to 10,000 and more preferably from about 1000 to 6000.

Before the production of the "carbonic acid salts" from the amino polyethers containing in particular primary amino groups, it is possible if desired to convert all or some of the primary amino groups into secondary amino groups. This may be done, for example, by the addition of olefinically unsaturated compounds such as styrene or allyl alcohol; $\alpha$, $\beta$-unsaturated nitriles such as acrylonitrile; $\alpha$, $\beta$-unsaturated carboxylic acid esters such as (meth)acrylic acid ethyl ester or crotonic acid ethyl ester; or $\alpha$, $\beta$-unsaturated carboxylic acids such as acrylic acid or methacrylic acid, in accordance with F. Moller in Houben-Weyl, Methoden der Organischen Chemie, Vol. XI/1, Thieme-Verlag, Stuttgart, 1957, page 267.

The production of the "carbonic acid salts" from the "aminopolyethers" (the latter term applies representatively to pure "aminopolyethers" and to only partly aminated compounds, i.e. compounds still containing alcoholic hydroxyl groups) is not complicated. For this purpose, it is generally sufficient to add a calculated quantity of water to the aminopolyethers or to a mixture of different aminopolyethers and then to introduce carbon dioxide into the mixture. In accordance with the foregoing observations, the quantity of water is selected in such a way that at most 80 equivalent percent of the "carbonic acid salts" represent ammonium carbamate groups. The water is preferably used in a quantity of from about 0.2 to 2 moles and, more preferably, in a quantity of from about 0.5 to 1 mole per mole of amino groups in the aminopolyether.

The carbon dioxide is preferably introduced under normal pressure, although it may also be introduced under excess pressure. Both the addition of water to the amine and also the introduction of carbon dioxide into the amine-containing aqueous phases are exothermic. In view of the relatively small amino group content of the amino compounds in question, the release of heat is so mild that there is generally no need to apply cooling. However, it is also possible to use solid carbon dioxide, so-called "dry ice".

The modification reaction may also be carried out in the presence of solvents, such as for example methanol, ethanol, dioxane or acetonitrile, although this is generally not necessary.

The modification of the aminopolyethers with water and carbon dioxide is generally carried out at temperatures in the range from about 10° to 70° C. and preferably at temperatures in the range from about 20° to 40° C. In general, the introduction of carbon dioxide is continued until the take-up of carbon dioxide is only minimal or has reached the saturation level. This ensures that the majority of amino groups present in the amino polyethers are converted into a salt form. In accordance with the foregoing observations, however, smaller quantities of carbon dioxide may also be introduced, although this is less preferred.

The "carbonic acid salts", i.e. the compounds according to the invention containing isocyanate-reactive groups have a viscosity which, at best, is only slightly increased by comparison with the polyhydroxy polyethers or aminopolyethers used as starting materials. They are substances which are liquid at room temperature and which may be stored almost indefinitely without giving off carbon dioxide.

The compounds according to the invention containing isocyanate-reactive groups represent component (b1) of the process according to the invention. Although it is possible in principle to use the compounds according to the invention, which in accordance with the foregoing observations, are generally mixtures of individual components differing in structure, as the sole reactant for the polyisocyanates (a) mentioned by way of example hereinafter, the compounds according to the invention are preferably used in admixture with other mixing components.

In addition to a polyisocyanate component (a) containing at least one di- or polyisocyanate and having only aromatically bound isocyanate groups and to the compounds (b1) essential to the invention, the following may also be used as synthesis components for the microcellular or foamed moldings in accordance with the present invention:

(b2) at least one compound free from ammonium carbamate, carbonate and bicarbonate groups and having at least two isocyanate-reactive groups and a molecular weight in the range from about 400 to 10,000, (b3) at least one chain-extending or crosslinking agent which is free from ammonium carbamate, carbonate and bicarbonate groups and which has a functionality of at least two in the isocyanate polyaddition reaction and a molecular weight in the range from about 18 to 399 and (c) the auxiliaries and additives known per se in polyurethane chemistry.

Synthesis components (b2) and (b3) may be used in admixture with component (b1) which is essential to the invention. Accordingly, they are mixing components for component (b1). The auxiliaries and additives may be added to and mixed with the polyisocyanate component (a) and/or component (b). The auxiliaries and additives are preferably added to and mixed with the combined components (b).

The polyisocyanate component (a) used in the process according to the invention is an aromatic di- and/or polyisocyanate, i.e. a polyisocyanate exclusively containing aromatically bound isocyanate groups. Examples of compounds such as these are 2,4- and/or 2,6-diisocyanatotoluene; 2,2'-, 2,4'- and/or 4,4'-diisocyanatodiphenyl methane; mixtures of these latter isomers with their higher homologs of the type obtained in the known phosgenation of aniline/formaldehyde condensates; reaction products containing urethane groups of any of the above-mentioned di- and/or polyisocyanates with subequivalent quantities of aliphatic polyhydroxyl compounds having a molecular weight in the range from about 62 to 700 such as ethylene glycol, trimethylol propane, propylene glycol, dipropylene glycol or polypropylene glycols having molecular weights in the above-mentioned range; di- and/or polyisocyanates modified by the conversion into carbodiimide groups of some of the isocyanate groups in the above-mentioned di- and/or polyisocyanates; methyl-substituted diisocyanates of the diphenyl methane series and mixtures thereof, for example of the type described in EP-OS No. 0 024 665; or mixtures of these aromatic di- and polyisocyanates.

Preferred starting materials (a) include the derivatives of 4,4'-diisocyanatodiphenyl methane which are liquid at room temperature, for example the polyisocyanates containing urethane groups which may be obtained in accordance with DE-PS No. 1,618,380 (U.S. Pat. No. 3,644,457) by reacting 1 mole of 4,4'-diisocyanatodiphenyl methane with from about 0.05 to 0.3 mole of low molecular weight diols or triols, preferably polypropylene glycols having a molecular weight below 700, or 4,4'-diisocyanatodiphenylmethane-based diisocyanates containing carbodiimide and/or uretone imine groups, of the type which may be obtained, for example, in accordance with U.S. Pat. No. 3,152,162; U.S. Pat. No. 3,384,653; U.S. Pat. No. 3,449,256; DE-OS No. 25 37 685 or EP-OS No. 5233 (U.S. Application Ser. No. 903,308). The preferred polyisocyanates also include the modification products corresponding to those previously discussed, but based on mixtures of 2,4'- and 4,4'-diisocyanatodiphenyl methane or even mixtures of the 4,4'-diisocyanatodiphenyl methanes modified as described above with small quantities of higher than difunctional polyisocyanates of the diphenyl methane series, for example those of the type described in DE-OS No. 26 24 526. In general, the preferred polyisocyanates used in accordance with the invention are polyisocyanates or polyisocyanate mixtures of the diphenyl methane series which are liquid at room temperature and may optionally have been chemically modified as described above. They have an (average) NCO-functionality of from 2 to 2.5, preferably from 2 to 2.2 and, more preferably, 2 and contain 4,4'-diisocyanatodiphenyl methane as their main component, i.e. more than about 50% by weight.

Component (b2) optionally used as a starting material is generally a polyester polyol known from polyurethane chemistry and having an osmotically determinable (average) molecular weight of from 400 to about 10,000 preferably from about 1000 to 7000 and more preferably from about 2000 to 6000, but is preferably a polyether polyol known from polyurethane chemistry and having a molecular weight—calculable from the functionality and the content of functional groups—of from 400 to about 10,000, preferably from about 1000 to 7000 and more preferably from about 2000 to 6000 or a mixture of compounds such as these having an average molecular weight in the above-mentioned range.

Suitable polyester polyols are the known esterification products of low molecular weight, polyhydric alcohols such as ethylene glycol, 1,2-dihydroxy propane, 1,3-dihydroxy propane, 1,2-dihydroxy butane, 1,4-dihydroxy butane, 1,6-dihydroxy hexane, neopentyl glycol, glycerol or trimethylol propane, with subequivalent quantities of an at least dibasic acid or acid anhydride such as adipic acid, phthalic acid, or hexahydrophthalic acid or their anhydrides.

Suitable polyether polyols are the compounds already mentioned by way of example in reference to the production of component (b1) essential to the invention, although in this case the choice is restricted to polyether polyols having a molecular weight of at least 400. Basically, it is also possible to use as mixing component (b2) for the compounds (b1) essential to the invention, polyesters or polyethers of the type whose hydroxyl groups have been completely or partly converted into amino groups by one of the methods mentioned by way of example in the foregoing. However, the above-mentioned compounds containing hydroxyl groups are preferably used as component (b2). Component (b2) generally has an (average) functionality in the context of the isocyanate addition reaction of from 2 to 4 and preferably from 2 to 3.

Component (b3) may be selected from compounds or mixtures of compounds which have a molecular weight of from 18 to 399 and which contain at least two isocyanate-reactive groups. These chain-extending agents or crosslinking agents are preferably compounds or mixtures of compounds selected from one of the following groups:

(i) aromatic diamines having a molecular weight in the range from 108 to 399, (ii) amino alcohols optionally containing ether groups and having a molecular weight in the range from 61 to 399, (iii) aliphatic polyamines having a molecular weight in the range from 60 to 399 and (iv) simple polyhydric alcohols having a molecular weight in the range from 62 to 399.

Suitable aromatic diamines (i) include any aromatic compounds having a molecular weight in the above-mentioned range and containing two primary and/or secondary aromatically bound amino groups. Preferred aromatic diamines (i) are those which contain an alkyl substituent at least in one ortho position to the amino groups, more particularly those which contain at least one alkyl substituent in the ortho position to the first amino group and two alkyl substituents each with 1 to 3 carbon atoms in the ortho position to the second amino group, but especially those which contain an ethyl, n-propyl and/or isopropyl substituent in at least one ortho position to the amino groups and, optionally, methyl substituents in other ortho positions to the amino groups.

Examples of suitable and preferred diamines are 2,4- and/or 2,6-diaminotoluene, 4,4'-diaminodiphenyl methane, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane or 3,5-diethyl-3',5'-diisopropyl-4,4'-diaminodiphenyl methane.

The aromatic diamines mentioned above may of course also be used in admixture with one another. In this connection, 1-methyl-3,5-diethyl-2,4-diaminobenzene or a mixture thereof with 1-methyl-3,5-diethyl-2,6-diamino-benzene is particularly preferred.

Suitable amino alcohols (ii) include simple amino alcohols such as aminoethanol, aminopropanol, diethanolamine, triethanolamine, or even low molecular weight alkoxylation products of aminic starter molecules containing at least 2 N—H bonds such as for example the ethoxylation or propoxylation products—optionally containing ether bridges—of ammonia, ethylene diamine or hexamethylene diamine.

Suitable aliphatic amines (iii) include simple aliphatic diamines containing primary amino groups such as ethylene diamine, 1,3-diamino propane, hexamethylene diamine or 1,2-diamino-propane.

Suitable low molecular weight polyhydric alcohols (iv) include ethylene glycol, 1,2- and 1,3-dihydroxy propane, 1,4-dihydroxy butane, 1,6-dihydroxy hexane, trimethylol propane, glycerol, pentaerythritol or low molecular weight polyols containing ether groups such as diethylene glycol, triethylene glycol or dipropylene glycol.

The aromatic diamines (i) mentioned by way of example, optionally in admixture with simple alcohols of the type mentioned by way of example under (iv), particularly with ethylene glycol or 1,4-butane diol, are the preferred chain-extending agents according to the invention.

As already indicated, the type of and quantitative rations between the compounds selected from components (b1) and (b3) are selected in such a way that from about 0.2 to 100, preferably from about 2 to 50 and more preferably from about 10 to 40 equivalent percent of all the isocyanate-reactive groups in component (b), taking the above-mentioned limitation into account, are ammonium carbamate, carbonate and/or bicarbonate groups. Moreover, mixtures of the individual components (b1) to (b3), in which the ratio by weight of (b1) to (b3) or—where compounds (b2) are also used—the ratio by weight of (b1)+(b2) to (b3) amounts to between about 1:1 and 20:1, preferably between 1.5:1 and 10:1 and more preferably between about 2.5:1 and 8:1, are preferably used in the process according to the invention.

Auxiliaries and additives (c) suitable for use in accordance with the invention are, for example, the so-called internal release agents known from the prior art. Preferred internal mold release agents are those of the type described, for example in DE-OS No. 19 53 637 (equals U.S. Pat. No. 3,726,952), DE-OS No. 21 21 670 (equals GB-PS No. 1,365,215), DE-OS No. 24 31 968 (equals U.S. Pat. No. 4,098,731) and in DE-OS No. 24 04 310 (equals U.S. Pat. No. 4,058,492). Preferred release agents include the salts containing at least 25 aliphatic carbon atoms of fatty acids having at least 12 aliphatic carbon atoms and primary mono-, di- or polyamines containing 2 or more carbon atoms or amide or ester amines containing at least one primary, secondary or tertiary amino group; saturated and/or unsaturated esters containing COOH- and/or OH-groups of mono- and/or polybasic carboxylic acids and polyhydric alcohols having hydroxyl or acid numbers of at least 5; ester-like reaction products of ricinoleic acid and long-chain fatty acids; polyricinoleic acids; salts of carboxylic acids and tertiary amines; and also natural and/or synthetic oils, fats or waxes.

The oleic acid or tall oil fatty acid salt of the amine containing amide groups obtained by reacting N-dimethylaminopropylamine with oleic acid or tall oil fatty acid is particularly preferred.

In addition to these preferred release agents mentioned by way of example, it is also possible in principle to use other conventional release agents known per se either individually or in admixture with the preferred release agents mentioned previously. These other suitable release agents include the reaction products of fatty acid esters and polyisocyanates according to DE-OS No. 23 19 648; the reaction products of polysiloxanes containing reactive hydrogen atoms with mono- and/or polyisocyanates according to DE-OS No. 23 56 692 (equals U.S. Pat. No. 4,033,912); esters of polysiloxanes containing hydroxy methyl groups with mono- and/or polycarboxylic acids according to DE-OS No. 23 63 452 (equals U.S. Pat. No. 4,024,090); and salts of aminopolysiloxanes and fatty acids according to DE-OS No. 24 27 273 or DE-OS No. 24 31 968 (U.S. Pat. No. 4,098,731).

The internal mold release agents mentioned above are used, if at all, in a total quantity of from about 0.1 to 25% by weight and preferably in a total quantity of about 1 to 10% by weight, based on the reaction mixture as a whole.

Although no catalysts for the reaction between isocyanate groups and isocyanate-reactive groups have to be used in the production of the moldings, particularly in cases where highly reactive hydroxyl-free components (b) and, in addition, where the preferred mold release agents (c) are used, the catalysts used in known manner in the production of polyurethane foams and microcellular elastomers may be used as further auxiliaries and additives (c).

Suitable catalysts are tertiary amines known per se and include triethylamine, tributylamine, N-methyl morpholine, N-ethyl morpholine, N,N,N',N'-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyl diethylene triamine, N,N-dimethylcyclohexylamine, N,N,N',N'-tetramethyl-1,3-butane diamine, N,N-dimethyl-imidazole-β-phenylethylamine, 1,2-dimethyl-imidazole and 2-methyl-imidazole.

Organometallic catalysts, particularly organotin catalysts, for example tin-(II) salts of carboxylic acids such as tin-(II) acetate, tin-(II) octoate, tin-(II) ethylhexoate and tin-(II) laurate, and the dialkyl tin salts of carboxylic acids such as dibutyl tin diacetate, dibutyl tin dilaurate, dibutyl tin maleate or dioctyl tin diacetate, may also be used either individually or in combination with the tertiary amines. Further representatives of catalysts and information on the way in which they work can be found in Kunststoff-Handbuck, Vol. VII, published by Vieweg and Hochtlen, Carl-Hanser-Verlag, Munich, 1966, for example on pages 96 to 102.

The catalysts are used, if at all, in quantities of from about 0.001 to 10% by weight and preferably in quantities of from about 0.05 to 1% by weight, based on component (b).

Blowing agents may also be used as part of component (c) in the process according to the invention. Thus, water (which simultaneously performs the function of a chain-extending agent through urea formation) and/or readily volatile organic substances and/or dissolved inert gases may additionally be used as blowing agents beyond the extent required for production of the carbonates.

Suitable organic blowing agents include acetone, ethylacetate, methanol, ethanol, halogen-substituted alkanes (such as dichloromethane, trichloromethane, vinylidene chloride, monofluorotrichloromethane, chlorodifluoromethane, dichlorodifluoromethane) butane, hexane, heptane or diethyl ether.

Suitable inert gases are, for example, nitrogen or air.

An additional blowing effect may also be obtained by adding compounds which decompose at temperatures above room temperature giving off gases such as nitrogen. Examples include the azo compounds such as azoisobutyronitrile. Other examples of blowing agents and information on the use of blowing agents may be found in Kunststoff-Handbuch, Vol. VII, published by Vieweg and Hochtlen, Carl-Hanser-Verlag, Munich, 1966, for example on pages 108 and 109, 453 and 455 and 507 to 510. However, the process according to the invention is preferably carried out in the absence of the conventional blowing agents from the chemistry of polyurethane foams which were mentioned purely by way of example.

Suitable foam stabilizers are, above all, water-soluble polyether siloxanes. The structure of these compounds is generally such that a copolymer of ethylene oxide and propylene oxide is attached to a polydimethyl siloxane radical. Foam stabilizers such as these are described, for example, in U.S. Pat. No. 2,764,565.

Further auxiliaries and additives which may optionally be used in the process according to the invention include cell regulators known per se such as paraffins or fatty alcohols or dimethyl polysiloxanes; also pigments or dyes and flameproofing agents known per se such as trichloroethyl phosphate or ammonium phosphate and polyphosphate; stabilizers against the effects of aging and weather; plasticizers; fungistatic and bacteriostatic agents; and also fillers such as barium sulfate, glass fibers, kieselguhr or whiting. Particularly preferred fillers are glass fibers.

Other examples of surface-active additives and foam stabilizers, flameproofing agents, plasticizers, dyes and fillers, fungistatic and bacteriostatic agents which may optionally be used in accordance with the invention and information on the use of these additives and the way in which they work can be found in Kunststoff-Handbuch, Vol. VII, published by Vieweg and Hochtlen, Carl-Hanser-Verlag, Munich, 1966, for example on pages 103 to 113.

In the practical application of the process according to the invention, the quantity in which component (a) (polyisocyanate component) is used is preferably measured in such a way that the foamable mixture has an isocyanate index of from about 70 to 130 and more particularly from about 90 to 110. The isocyanate index is understood to be the quotient of the number of isocyanate groups and the number of isocyanate-reactive groups multiplied by 100. Any isocyanate-reactive groups (carboxyl groups) present in the release agents are not included in the calculation of the isocyanate index. The ammonium carbamate groups enter as difunctional groups into the calculation of the isocyanate index.

In the process according to the invention, the starting materials are reacted with one another in a single stage in closed molds, for example in closed metal or plastic molds. Two reaction components are generally used for this purpose, the polyisocyanate component (a) representing the first component and the component containing isocyanate-reactive groups, i.e. component (b1) optionally in admixture with components (b2) and/or (b3), representing the second reaction component. Although the optional components (c) are generally added to and mixed with component (b), it can also be of advantage, for example in cases where release agents containing isocyanate groups are used, to incorporate component (c) in component (a) before the process according to the invention is carried out. It is of course also possible in principle to use mixing heads of the type which enable 3 or 4 separate components to be used in the practical application of the process according to the invention, so that preliminary mixing of the individual components is not necessary. As for the rest, the quantity in which the optionally foamable mixture is introduced into the mold is measured in such a way that the moldings have a density of from about 0.1 to 1.4 g/m$^3$ and preferably from about 0.6 to 1.1 g/cc. Moldings having a density above 1.0 g/cc may be obtained particularly where mineral fillers are used. The moldings, which generally have a homogeneous, largely faultless surface may be removed from the mold after a residence time of from about 5 to 300 seconds and preferably from about 10 to 120 seconds. The starting temperature of the mixture introduced into the mold is generally a temperature in the range from about 10° to 60° C. and preferably in the range from about 20° to 50° C. The temperature of the mold is generally in the range from about 40° to 100° C. and preferably in the range from about 50° to 70° C.

The question of whether moldings having a non-porous outer skin (moldings having a gross density below 0.6 g/cc) or microcellular moldings (those having a gross density above 0.6 g/cc) are obtained in the process according to the invention depends upon the quantity of "carbonic acid salts" present in the reaction mixture, the quantity of blowing agents used and the quantity of reaction mixture introduced into the mold. Accordingly, the gross density of the moldings may be adjusted by suitably varying these variables. Processing is preferably carried out by the known reaction injection molding (RIM) technique. The reaction injection-molding technique is a filling technique in which the highly active, liquid starting components are injected very quickly into the mold through high-output high-pressure metering units after mixing in so-called positively controlled mixing heads. One of the advantages of the process according to the invention lies in the fact that the "carbonic acid salts" essential to the invention develop their blowing effect through release of the carbon dioxide immediately after the reaction components have been mixed, so that, even in the mass production of polyurethane and polyurea moldings on an industrial scale, cellular moldings can be obtained after residence times in the mold of less than 1 minute; whereas, conventional blowing agents (fluorinated hydrocarbons and water) develop their blowing effect so slowly that highly reactive systems of the type mentioned cannot be converted by means of these blowing agents into microcellular moldings having a density reduced by more than 20%. Another advantage of using the "carbonic acid salts" according to the invention lies in the fact that they enable elastomeric moldings to be mass-produced without any problems (even thin-walled moldings can be readily removed from their molds without the use of external release agents). In the systems previously used, even the use of the conventional internal mold release agents mentioned by way of example in the foregoing in the production of elastomeric moldings led at best to only a slight improvement in the self-releasing properties, so that the use of external mold release agents was essential. However, the combination according to the invention of the known internal release agents with the "carbonic acid salts" essential to the invention completely eliminates the need to use external release agents. Another advantage of the "carbonic acid salts" essential to the invention lies in the fact that their use, even in very low concentrations, in the production of integral foams brings about a considerable improvement in the surface quality of the moldings, by virtue of which there are no more irregularities to be seen, for example after immersion lacquering.

The process according to the invention is particularly suitable for the production of high-quality, elastomeric microcellular moldings which may be used, for example, as body components in the automotive industry. However, by suitably varying the starting compounds and, in particular, by using a relatively low percentage of diamines in component (b3), it is also possible for example to obtain flexible shoesoles having high abrasion resistance and excellent mechanical strength. In addition, provided that the starting compounds and the ratios in which they are used are suitably selected, the process according to the invention is suitable for the production of rigid microcellular moldings or for the production of flexible to rigid integral foams.

Reaction mixtures of the type used in accordance with the invention may also be employed for the production of free-foamed foams. Thus, the foamable mixtures may also be used, for example, for coating webs and profiles.

In the following Examples, all the percentages quoted represent percentages by weight, unless otherwise indicated.

EXAMPLES

The following components (b1) ("carbonic acid salts") were used in the following examples. In the production of the carbonic acid salts, the quantity of water used was always measured in such a way that only the amino groups were modified through bicarbonate or carbonate formation):

Carbonic acid salt I

Gaseous carbon dioxide was introduced with stirring at room temperature up to saturation level into a mixture of 52.6 g of water and 450 g of a commercially available amino polyether (Jeffamine T 403, a product of Jefferson Chemical Company, Inc.) having an average molecular weight of 438, which is the propoxylation product of trimethylol propane containing terminal amino groups (6.75 milliequivalents of isocyanate-reactive groups per g of amino polyether of which 6.16 milliequivalents per g are primary amino groups for a total amine nitrogen content of 6.45 milliequivalents per g), followed by stirring for 1 hour. An increase in weight of 63 g, corresponding to 1.43 moles of carbon dioxide, was determined by weighing out the reaction product. Accordingly, at least 49% of the amino groups were present in a modified form (hypothetically assuming the exclusive formation of bicarbonate groups).

Carbonic acid salt II

Carbon dioxide was introduced with stirring at room temperature up to the saturation level into a mixture of 12.6 g of water and 700 g of a commercially available aminopolyether (Jeffamine D 2000) having an average molecular weight of 2000, which is a linear polypropylene oxide containing terminal primary amino groups (1.01 milliequivalents of isocyanate-reactive groups per g of amino polyether of which 0.95 milliequivalents per g are primary amino groups for a total amine nitrogen content of 0.96 milliequivalents per g). The mixture underwent an increase in temperature to approximately 30° C. and was then stirred for 1 hour. An increase in weight of 20 g (455 mMoles of $CO_2$) was determined by weighing. Accordingly, at least 65% of the basic amino groups originally present had been converted into carbonic acid salt groups.

Carbonic acid salt III

Carbon dioxide was introduced with stirring at room temperature into 6.2 g of water and 700 g of an amino polyether having an average molecular weight of 5600, which had been obtained by reacting the adduct of propylene oxide and trimethylol propane with ammonia in the presence of hydrogen and Raney nickel to obtain a product wherein more than 90 equivalent percent of the isocyanate-reactive terminal groups were primary amino groups, less than 1 equivalent percent were secondary hydroxyl groups and the base nitrogen content amounted to 0.69% (HCl titration). After saturation with carbon dioxide, the reaction mixture was stirred for 1 hour. A total of approximately 11.4 g of carbon dioxide was thus taken up. It follows from this that at least approximately 75% of the amino groups present had been converted into carbonic acid salt groups.

Carbonic acid salt IV

The aminopolyether used for the production of carbonic acid salt III was modified by treatment with acrylonitrile in the presence of potassium hydroxide at 80° C. in such a way that, for a total base nitrogen content of 1.37%, it contained 0.92% of primary nitrogen, 0.45% of secondary nitrogen and 0.01% of tertiary nitrogen.

2160 g of the aminopolyether thus modified (2.11 moles of base nitrogen) were mixed with 38 g of water (2.11 moles) and gaseous carbon dioxide was introduced into the resulting mixture with stirring at room temperature. After saturation, the mixture was stirred for 1 hour. In all, 30.2 liters of carbon dioxide were taken up in this way. It follows from this that at least 64% of all the amino groups present had been converted into carbonic acid salt groups.

Carbonic acid salt V 762 g of 50% potassium hydroxide (2.4 moles of KOH) were diluted with 1 liter of water and introduced into a suitable vessel equipped with a stirrer, thermometer, reflux condenser and a dropping funnel. 1 kg of a prepolymer having an NCO-content of 5.03% (1.2 moles NCO) was then added over a period of 40 minutes at an internal temperature of 32° to 36° C. This prepolymer was produced by reacting hexamethylene diisocyanate and polypropylene glycol (OH number 112) in an NCO:OH-ratio of 12:1, followed by removal of the excess, monomeric isocyanate by distillation in a thin-layer evaporator.

The mixture was then stirred for 30 minutes at an internal temperature of approximately 30° C. The reaction mixture had to be cooled during addition of the NCO-prepolymer to the diluted potassium hydroxide. 59 g of dimethyl formamide were then added, followed by heating to 60°-75° C. for 30 minutes, during which dimethylamine was given off. After cooling to 20° C., the lower phase formed was separated off while 500 ml of dioxane were added to the upper phase which was then filtered and concentrated. The product formed had a base nitrogen content of 1.57% (theoretical 1.73%) and the yield amounted to 99%.

Gaseous carbon dioxide was introduced at 60° C. up to the saturation level into 610 g (base nitrogen content 0.68 mole) of this urethane-modified polyether amine which had been mixed with 6.2 g (0.342 mole) of water. A total of 8 liters (approximately 0.36 mole) of carbon dioxide was taken up. Accordingly, at least 53% of the amino groups were present in modified form.

Carbonic acid salt VI

Gaseous carbon dioxide was introduced with stirring up to the saturation level into a mixture of 32 g of water and 250 g of a commercially available aminopolyether (Jeffamine D 400) having an average molecular weight of 400, which is a linear polypropylene oxide containing terminal primary amino groups (5.17 milliequivalents per g of isocyanate-reactive groups, of which 4.93 milliequivalents per g are primary amino groups for a total amine nitrogen content of 4.99 milliequivalents per g). The internal temperature of the mixture rose from room temperature to 46° C. After the mixture had been saturated with carbon dioxide, it was stirred for another hour at room temperature. A total of 0.58 mole of carbon dioxide was taken up. It follows from this that at least 46% of the amino groups were present in modified form.

EXAMPLES

The formulations described in Examples 1 to 13 below were processed by the reaction injection molding (RIM) technique.

The polyisocyanate component and the countercomponent containing all the other constituents were delivered to a high-pressure metering unit and, after intensive mixing in a positively controlled mixing head, were introduced under pressure very quickly into a metal mold heated to 60° C.

A closed aluminum mold measuring 4×120×400 mm was used as the mold in Examples 1 to 7. The mold used in Examples 8 to 13 was also a closed aluminum mold measuring 10×200×200 mm of which the inner walls had been sprayed with a commercially available wax-based release agent.

EXAMPLE 1 (Comparison Example)

77 parts by weight of a polyether polyol (OH number 28) produced by the propoxylation of trimethylol propane and subsequent ethoxylation of the propoxylation product (ratio by weight of PO to EO=85:15) were combined with 23 parts by weight of a mixture of 65% by weight of 1-methyl-3,5-diethyl-2,4-diaminobenzene and 35% by weight of 1-methyl-3,5-diethyl-2,6-diaminobenzene, 0.1 part by weight of triethylene diamine and 0.1 part by weight of dibutyl tin dilaurate to form a "polyol component". This polyol component was reacted with 57 parts by weight of a polyisocyanate mixture having an NCO-content of 24.5%. This polyisocyanate mixture had been prepared beforehand by reacting a polyisocyanate mixture of the diphenyl methane series containing 82 parts by weight of 4,4'-diisocyanatodiphenyl methane, 8 parts by weight of 2,4'-diisocyanatodiphenyl methane and 10 parts by weight of trifunctional and higher polyisocyanates of the diphenyl methane series with dipropylene glycol. In this Example and also in Examples 2 to 7, the starting materials were heated to 40° C. before introduction into the mold. In Examples 1 to 7, the residence time in the mold was 3 minutes.

The formulations of Examples 1 to 7 are shown in Table 1. The mechanical properties of the solid and microcellular elastomers obtained are shown in Table 2.

EXAMPLE 2

Example 2 differs from Comparison Example 1 through partial replacement of the polyol by carbonic acid salts I and II. A microcellular molding having excellent mechanical properties was obtained.

EXAMPLES 3 AND 4

Examples 3 and 4 differ from Comparison Example 1 through replacement of part of the polyether polyol by carbonic acid salt II (5 parts by weight in Example 3 and 10 parts by weight in Example 4).

Comparison of the mechanical data of Examples 1 and 3 shows that the slightly foamed molding according to Example 3 shows distinctly better mechanical properties (modulus of elasticity and tensile strength distinctly increased).

EXAMPLES 5 AND 6

Examples 5 and 6 differ from Comparison Example 1 through partial replacement of the polyether polyol by carbonic acid salt III (10 parts by weight in Example 5 and 30 parts by weight in Example 6).

As can be seen from Table 2, the slightly foamed molding (Example 5) again shows surprisingly good mechanical properties. Examples 4 and 6 show that the co-use of the carbonic acid salts essential to the invention provides for a distinct reduction in gross density. Despite their lower gross densities, the corresponding moldings show good mechanical properties.

EXAMPLE 7

Example 7 differs from Comparison Example 1 in the co-use of carbonic acid salts III and VI as indicated in Table 1. Once again, the mechanical properties are surprisingly good despite the lower gross densities, as can be seen from Table 2.

TABLE 1

| Formulations of Examples 1 to 7 | | | | | | | |
|---|---|---|---|---|---|---|---|
| | Example No. | | | | | | |
| (quantities in parts by weight) | 1 | 2 | 3 | 4 | 5 | 6 | 7 |
| Polyol | 77 | 55 | 72 | 67 | 67 | 47 | 47 |
| Carbonic acid salt I | — | 2 | — | — | — | — | — |
| Carbonic acid salt II | — | 5 | 5 | 10 | — | — | — |
| Carbonic acid salt III | — | — | — | — | 10 | 30 | 10 |
| Carbonic acid salt VI | — | — | — | — | — | — | 2 |
| Amine crosslinker | 23 | 23 | 23 | 23 | 23 | 23 | 23 |
| Triethylene diamine | 0.1 | 0.1 | 0.1 | 0.1 | 0.1 | 0.1 | 0.1 |
| Tin catalyst | 0.1 | 0.1 | 0.1 | 0.1 | 0.1 | 0.1 | 0.1 |
| Polyisocyanate | 57 | 57 | 57.5 | 58 | 57 | 57 | 57 |

TABLE 2

| Mechanical data of Examples 1 to 7 | | | | | | | |
|---|---|---|---|---|---|---|---|
| Example No. | 1 | 2 | 3 | 4 | 5 | 6 | 7 |
| Gross density (DIN 53420) [kg/M$^3$] | 1100 | 800 | 1050 | 830 | 1050 | 650 | 730 |
| Shore D hardness (DIN 53505) | 65 | 47 | 61 | 50 | 61 | 39 | 45 |
| Modulus of elasticity (ASTM-D-790-71) [MPa] | 330 | 300 | 380 | 260 | 370 | 190 | 210 |
| Tensile strength (DIN 53505) [MPa] | 17.6 | 19.6 | 28.5 | 12.1 | 32.5 | 8.8 | 14.1 |
| Breaking elongation | 220 | 190 | 230 | 170 | 250 | 150 | 200 |

EXAMPLE 8 (COMPARISON EXAMPLE)

Production of a flexible integral foam 95 parts by weight of the polyether polyol of Example 1, 5 parts by weight of ethylene glycol, 0.4 parts by weight of water, 0.35 part by weight of triethylene diamine, 0.5 part by weight of permethylated ethylene diamine and 8 parts by weight of trichlorofluoromethane were combined to form a "polyol component". The polyol component thus produced was then reacted with 28 parts by weight of a polyisocyanate component in the metal mold described above to form a flexible integral foam having the mechanical properties shown below. The polyisocyanate component used was a mixture of 10 parts by weight of 2,4′-diisocyanatodiphenylmethane, 75 parts by weight of 4,4′-diisocyanatodiphenylmethane and 15 parts by weight of trifunctional and higher polyisocyanates of the diphenylmethane series. The temperature of the reaction mixture introduced into the mold was 40° C. Mechanical properties of the flexible integral foam having a compact outer skin:

| | |
|---|---|
| Gross density (DIN 53420) | 120 kg/m$^3$ |
| Tensile strength (DIN 53571) | 150 kPa |
| Breaking elongation (DIN 53571) | 130% |
| Compression hardness (DIN 53577) | 15 kPa |

The outer skin of the molded foam showed clearly visible streaks which is indicative of inadequate mixing of the reaction components. In addition, the filling level (dwell zone) of the foamable, liquid reaction mixture was faintly marked.

EXAMPLE 9

The procedure was as described in Example 8, except that 10 parts by weight of the polyether polyol were replaced by 10 parts by weight of carbonic acid salt II. On this occasion the mixture foamed immediately so that the resulting molding was neither streaked nor showed any marks of the dwell zone for otherwise virtually the same properties of the molding. Equally good results were obtained where 10 parts by weight of carbonic acid salt IV or 8 parts by weight of carbonic acid salt V were used instead of the 10 parts by weight of carbonic acid salt II.

EXAMPLE 10

Production of an elastomeric, microcellular molding 55 parts by weight of carbonic acid salt II were combined with 18.3 parts by weight of the polyether polyol of Example 1, 22 parts by weight of the diamine mixture of Example 1, 0.14 part by weight of dibutyl tin dilaurate, 0.1 part by weight of triethylene diamine, 4.5 parts by weight of the stoichiometric tall oil fatty acid salt of 1 mole of tall oil fatty acid and 1 mole of amide-amine, produced from 1 mole of 1-amino-3-(dimethylamino)-propane and 1 mole of tall oil fatty acid, to form a "polyamine component". 40 parts by weight of ground glass fibers having an average length of 0.2 mm were then added to the polyamine component and the mixture thus obtained processed with 60.5 parts by weight of a reaction product of tripropylene glycol and 4,4′-diisocyanatodiphenylmethane (NCO-content: 23%) in the metal mold mentioned above to form an elastomeric molding. The starting materials introduced into the mold were heated beforehand to 40° C. The residence time in the mold was 1 minute.

The resulting molding shows the following properties:

| | |
|---|---|
| Gross density (DIN 53420) | 870 kg/m$^3$ |
| Tensile strength (DIN 53504) | 25 MPa |
| Breaking elongation (DIN 53504) | 260% |
| Tear propagation resistance with cut (DIN 53515) | 56 KN/m |
| Shore-D-hardness (DIN 53505) | 47 |
| Modulus of elasticity (ASTM-D 790-71) | 630 MPa |

EXAMPLE 11

Production of an integral rigid foam 50 parts by weight of a tetrafunctional crosslinking agent (OH number 790), produced by the propoxylation of ethylene diamine, 40 parts by weight of carbonic acid salt III, 10 parts by weight of the diamine mixture according to Example 1, 6 parts by weight of an emulsifier (produced by reacting 2 moles of oleic acid with 1 mole of 1-amino-3-(dimethylamino)-propane) and 0.1 part by weight of triethylene diamine were reacted with 145 parts by weight of a polyisocyanate mixture in the metal mold described above to form a rigid integral foam having the mechanical properties shown below. The polyisocyanate component used was a mixture of equal parts by weight of (a) the modified polyisocyanate mixture mentioned in Example 1 and (b) a polyisocyanate mixture of the diphenyl methane series containing 59.7% of diisocyanatodiphenylmethane isomers, 21.3% of trifunctional polyisocyanates of the diphenyl methane series and 19% of higher polyisocyanates of the diphenyl methane series.

The mixture as a whole had an NCO-content of 28% and a viscosity of approximately 130 mPa.s/25° C. The temperature of the reaction mixture introduced into the mold was 40° C. and the residence time in the mold was 3 minutes.

| Mechanical properties: | |
|---|---|
| Gross density (DIN 53420) | 840 kg/m$^3$ |
| Heat distortion temperature (f = 10 mm, DIN 53424) | 160° C. |
| Modulus of elasticity (ASTM-D-790-71) | 1230 MPa |
| Shore-D-hardness (DIN 53505) | 76 |

EXAMPLE 12

Semi-rigid integral foam 90 parts by weight of a polyester diol (OH number 56) of adipic acid, 1,4-dihydroxy butane and ethylene glycol, 14 parts by weight of 1,4-dihydroxy butane, 0.4 part by weight of water, 0.5 part by weight of triethylene diamine and 2 parts by weight of carbonic acid salt II were combined to form a "polyol component". The polyol component thus produced was processed with 52 parts by weight of an NCO-prepolymer (NCO-content 19%) of 4,4'-diisocyanatodiphenylmethane and the above-mentioned polyester diol (OH number 56) in the metal mold described above to form a semirigid integral polyurethane foam. The temperature of the reaction mixture introduced into the mold was 40° C. and the residence time in the mold was 3 minutes.

| Mechanical properties: | |
|---|---|
| Gross density (DIN 53420) | 550 kg/m$^3$ |
| Shore-A-hardness (DIN 53505) | 60 |
| Tensile strength (DIN 53504) | 9 MPa |
| Breaking elongation (DIN 53504) | 500% |
| Tear propagation resistance (DIN 53507) | 14 KN/m |

The addition of the carbonic acid salt produced a considerable improvement in the surface of the molding by virtue of which no more dwell zone marks could be seen after immersion lacquering.

EXAMPLE 13

Semirigid polyurethane integral foam 80 parts by weight of a polyether diol (OH number 28), produced by the propoxylation of 1,2-dihydroxy propane and subsequent ethoxylation of the propoxylation product (ratio by weight of PO to EO=85:15), 20 parts by weight of the polyether polyol (OH number 28) according to Example 1, 8 parts by weight of the diamine mixture according to Example 1, 0.2 part by weight of triethylene diamine, 0.15 part by weight of dibutyl tin dilaurate, 10 parts by weight of trichlorofluoromethane and 10 parts by weight of carbonic acid salt II were combined to form a "polyol component". This polyol component was processed with 36 parts by weight of a reaction product of 4,4'-diisocyanatodiphenylmethane and tripropylene glycol, which had an NCO-content of 23%, in the metal mold described above to form a semirigid integral foam. The temperature of the starting materials introduced into the mold was 28° C. and the residence time in the mold was 2 minutes.

| Mechanical properties: | |
|---|---|
| Gross density (DIN 53420) | 700 kg/m$^3$ |
| Shore-A-hardness (DIN 53505) | 60 |
| Tensile strength (DIN 53504) | 5 MPa |
| Breaking elongation (DIN 53504) | 450% |
| Tear propagation resistance (DIN 53507) | 14 KN/m |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane-urea or polyurea-based microcellular or foam molding which comprises reacting in closed molds in accordance with the one-shot process
   (a) a polyisocyanate component containing aromatically bound isocyanate groups and selected from the group consisting of diisocyanates and polyisocyanates and
   (b) an isocyanate-reactive component which comprises at least one compound containing at least three aliphatic ether groups and n aliphatically bound isocyanate-reactive groups and is characterized by the following,
      (i) at least 100/n percent of said aliphatically bound isocyanate-reactive groups are aliphatically bound primary or secondary amino groups,
      (ii) at least 20% of the total number of aliphatically bound primary or secondary amino groups are modified amino groups selected from the group consisting of ammonium carbamate groups having a functionality of 2 in the isocyanate addition reaction and prepared by reacting aliphatically bound primary or secondary amino groups with carbon dioxide and ammonium carbonate and ammonium bicarbonate groups formed by the reaction of aliphatically bound primary or secondary amino groups with carbon dioxide and water,
      (iii) at least 20% of the total number of said modified amino groups of (ii) being carbonate and/or bicarbonate groups,
      (iv) the unmodified compounds containing ether groups but prior to containing ammonium carbamate, carbonate or bicarbonate groups having a molecular weight of from about 200 to 10,000 and
      (v) from about 0.2 to 100% of the total number of isocyanate-reactive groups of component (b) being ammonium carbamate, carbonate or bicarbonate groups.
wherein n is a whole or fractional number from 2 to 4 and the ratio of component (a) to (b) is chosen to provide an isocyanate index of from 70 to 130.

2. The process of claim 1 wherein component (b) comprises at least one isocyanate-reactive compound having a molecular weight of from 400 to about 10,000 and which is free from ammonium carbamate, carbonate and bicarbonate groups and, additionally, at least one chain extending or crosslinking agent having a molecular weight of from 18 to 399, a functionality of at least 2 in the isocyanate addition reaction and which is free from ammonium carbamate, carbonate and bicarbonate groups.

3. The process of claim 2 wherein said chain extending or crosslinking agent is selected from the group consisting of
 (a) diamines containing two primary and/or secondary aromatically bound amino groups and having a molecular weight from 108 to 399,
 (b) amino alcohols containing at least two isocyanate-reactive groups, having a molecular weight from 61 to 399, and which may contain ether groups,
 (c) aliphatic polyamines containing at least two primary or secondary amino groups and having a molecular weight from 60 to 399 and
 (d) primary or secondary alcohols having at least two hydroxyl groups, a molecular weight from 62 to 399 and which may contain ether groups.

4. The process of claim 3 wherein said diamines of component (a) contains ethyl, n-propyl and/or isopropyl substituents in at least one ortho position to the respective amino groups and, optionally, methyl substituents in other ortho positions to the amino groups.

5. The process of claim 1 wherein an internal mold release agent is additionally present with the other components.

6. The process of claim 1 wherein said process is conducted by reaction injection molding.

7. The process of claim 4 wherein said process is conducted by reaction injection molding.

8. A composition comprising an isocyanate-reactive component which further comprises at least one compound containing at least three aliphatic ether groups and n aliphatically bound isocyanate-reactive groups and is characterized by the following, (i) at least 100/n percent of said aliphatically bound isocyanate-reactive groups are aliphatically bound primary or secondary amino groups,
 (ii) at least 20% of the total number of aliphatically bound primary or secondary amino groups are modified amino groups selected from the group consisting of ammonium carbamate groups having a functionality of 2 in the isocyanate addition reaction and prepared by reacting aliphatically bound primary or secondary amino groups with carbon dioxide and ammonium carbonate and ammonium bicarbonate groups formed by the reaction of aliphatically bound primary or secondary amino groups with carbon dioxide and water,
 (iii) at least 20% of the total number of said modified amino groups of (ii) being carbonate and/or bicarbonate groups,
 (iv) the unmodified compounds containing ether groups but prior to containing ammonium carbamate, carbonate or bicarbonate groups having a molecular weight of from about 200 to 10,000 and
 (v) from about 0.2 to 100% of the total number of isocyanate-reactive groups of component (b) being ammonium carbamate, carbonate or bicarbonate groups.

wherein n is a whole or fractional number from 2 to 4 and the ratio of component (a) to (b) is chosen to provide an isocyanate index of from 70 to 130.

9. The composition of claim 8 wherein component (b) comprises at least one isocyanate-reactive compound having a molecular weight of from 400 to about 10,000 and which is free from ammonium carbamate, carbonate and bicarbonate groups and, additionally, at least one chain extending or crosslinking agent having a molecular weight of from 18 to 399, a functionality of at least 2 in the isocyanate addition reaction and which is free from ammonium carbamate, carbonate and bicarbonate groups.

* * * * *